United States Patent [19]

Fox et al.

[11] Patent Number: 4,975,534

[45] Date of Patent: Dec. 4, 1990

[54] PROCESS FOR PREPARING THERMAL CARBOHYDRATES

[76] Inventors: Sidney W. Fox, 707 S. Valley Rd., Carbondale, Ill. 62901; Peter R. Bahn, RR 1 Box 261, Woodlawn, Ill. 62898

[21] Appl. No.: 373,504

[22] Filed: Jun. 30, 1989

[51] Int. Cl.$^5$ .......................... C07G 3/00; C07H 1/00; C07H 3/00; C08B 37/00
[52] U.S. Cl. .................................. 536/123; 536/126; 536/124; 536/18.5; 536/4.1; 536/1.1
[58] Field of Search .................. 536/126, 124, 18.5, 536/18.6, 4.1, 123

[56] References Cited

U.S. PATENT DOCUMENTS

| | | | |
|---|---|---|---|
| 2,207,904 | 1/1936 | Farber | 536/126 |
| 2,387,275 | 10/1945 | Leuck | 536/126 |
| 2,436,967 | 3/1948 | Leuck | 536/126 |
| 2,719,179 | 9/1955 | Mora et al. | 536/126 |
| 3,274,012 | 9/1966 | Cooper et al. | 536/126 |
| 4,663,448 | 5/1987 | Chiu | 536/104 |

*Primary Examiner*—Ronald W. Griffin
*Assistant Examiner*—Everett White
*Attorney, Agent, or Firm*—Peter R. Bahn

[57] ABSTRACT

Glucose, and separately a 1:1 mixture of glucose and fructose, were thermally polymerized in the presence of glutamic acid to yield artificial carbohydrates with chemical linkages different from starch, cellulose, or chitin.

1 Claim, No Drawings

PROCESS FOR PREPARING THERMAL CARBOHYDRATES

BACKGROUND OF THE INVENTION

A saccharide can be defined as a polyhydroxyaldehyde or a polyhydroxyketone usually of the formula $(CH_2O)_n$ where $n \geq 3$. Saccharides are commonly referred to as sugars. For example common table sugar is a dimer of one glucose molecule and one fructose molecule. Polysaccharides are defined as polymers of monosaccharides and are commonly referred to as carbohydrates. For example, starch is a polysaccharide which is a linear polymer of α-D-glucose with a (1→4) chemical linkage between monosaccharide units. Cellulose is a polysaccharide which is a linear polymer of β-D-glucose (1→4). Chitin is a polysaccharide which is a homopolymer of N-acetyl-D-glucosamine (chitin is not a pure carbohydrate since it contains nitrogen).

Polysaccharides serve as nutrients, for example the starch found in many foods, and also as building materials, for example the cellulose found in wood and the chitin found in arthropod exoskeletons.

Previously, Mora and his colleagues (1958, 1960) polymerized various monosaccharides by heating the monosaccharides either with infrared radiation under vacuum conditions with 0.164% phosphorous acid ($H_3PO_3$) or with tetramethylene sulfone and 0.164% $H_3PO_3$. Mora and his group found that polyglucoses of 8,000 to 30,000 Dalton Molecular weights were formed under such reaction conditions.

Intense infrared radiation, or solvation in tetramethylene sulfone and the presence of a strong acid such as $H_3PO_3$, however, constitute very harsh reaction conditions which moreover were employed by Mora et al (1958) only within a complicated glassware laboratory set-up.

Although Mora et al (1958) demonstrated the production of a polyglucose, the chemical linkages of Mora's polyglucose and other homopolymers were not characterized. This failure may have been the result of Mora and his group assuming that such linkages were a random array. Furthermore, Mora and his coworkers never tried to copolymerize more than one type of monosaccharide at a time.

An object of this invention was to produce thermal artificial carbohydrates under simpler, more gentle reactions conditions than that used by Mora et al. (1958,1960).

It was another object of this invention to produce artificial carbohydrates containing more than one type of monosaccharide.

It was also a further object of this invention to characterize the types of chemical linkages formed during application of the methods for preparation of the said artificial carbohydrates.

SUMMARY OF THE INVENTION

Previous use by Fox and his colleagues (1958,1960,1962,1963) of glutamic acid as a protective solvent precursor (of pyroglutamic acid) for the thermal copolymerization of amino acids suggested that glutamic acid might also act as a protective solvent precursor for the thermal polymerization of monosaccharides into polysaccharides. This was found to be the case. When glutamic acid was heated either with glucose alone or with a 1:1 mixture of glucose and fructose, pyroglutamic acid and thermal polyglucose or thermal polyglucofructose were formed. The pyroglutamic acid was separated from the resulting carbohydrate by dialysis. The resulting artificial carbohydrates had chemical linkages that differed from starch, cellulose, or chitin.

DESCRIPTION OF THE INVENTION

Preparation of Thermal Polyglucose PB IV 12

Thermal polyglucose PB IV 12 was prepared as follows. L-glutamic acid (30 g) and D(+)glucose (30g) were 9round together with a mortar and pestle. The mixture was placed in a 500 ml flask. The flask was placed in a hot mineral oil bath. The mixture was heated at 140° C. for 12 hrs. under a nitrogen atmosphere. The initial mixture turned into a brown foam which, after heating, was allowed to cool to a glass-like substance. This substance contained pyroglutamic acid and thermal polyglucose.

Distilled water (400 ml) was added to the brown glass-like substance. The mixture was stirred to dissolve as much solid as possible in the water. The resulting slurry was then filtered through filter paper to give about 300 ml of brown solution.

Then 30 g of $NaHCO_3$ was slowly stirred into the brown solution, after which the volume of the solution was brought up to 400 ml with distilled water. This step resulted in neutralization of the pyroglutamic acid in the brown solution. Then 30 g of NaCl was added to the solution to help "salt out" the polyglucose and pyroglutamic acid from the solution.

One liter of 95% ethanol was then added to the solution whereupon a light-colored precipitate came out of solution.

The solution was filtered through a Buchner funnel and filter paper to isolate the precipitate which was then washed with 1 liter of 95% ethanol on the Buchner funnel, and then allowed to dry. This resulted in a 12.2 g yield of tan powder.

The tan powder (12.2 g) was then dissolved in 500 ml of distilled water, filtered, and then placed in a sack of dialysis tubing with a 6000-8000 Dalton molecular weight cut-off. The dialysis sack was then placed in a large glass cylinder and fresh water was run through the cylinder for 3 days to dialyze the material. This got rid of any pyroglutamic acid or monosaccharides in the dialyzed material.

A brownish clear solution was retained by the dialysis sack. This solution was filtered through filter paper and then lyophylized to give 0.185 g of a brown powder thermal polyglucose.

Preparation of Thermal polyqlucofructose PB IV 15

Thermal polyglucofructose PB IV 15 was prepared in a fashion similar to that for thermal polyglucose PB IV 12 except that instead of 30 g of D(+)glucose, a mixture of 15 g of D(+)glucose and 15 g of D(−)fructose were used.

Chemical Characterization of Thermal Polyglucose PB IV 12

The presence or absence of starch-like chemical linkages in thermal polyglucose PB IV 12 was tested for with an iodine reagent developed by Hattori et al. (1951). Elemental iodine (0.11g) was dissolved in 10.0 ml of ethanol to give a 1% w/v $I_2$ solution. This 1% solution was diluted with an equal volume of water to give a 0.5% $I_2$ in 1:1 ethanol:water. When this 0.5% $I_2$ reagent was dropped onto authentic starch, a very dark blue stain appeared. When the $I_2$ reagent was dropped onto authentic dextrin, which is a type of polyglucose, no blue stain appeared. When the $I_2$ reagent was dropped onto some of the thermal polyglucose no blue stain appeared. Therefore the thermal polyglucose did not possess starch-like linkages, but it might possess dextrin-like linkages.

The presence or absence of cellulose-like linkages in the thermal polyglucose was tested for with an iodine—zinc chloride reagent developed by Hawk et al. (1954). Zinc chloride (20g) was dissolved in 8.5 ml of water (solution A). Potassium iodide (3 g) and $I_2$ (1.5 g) were dissolved in 60 ml of water (solution B). Solution B was added dropwise to solution A with stirring until $I_2$ began to precipitate out of solution. The reagent was then ready for use. When the $I_2$-ZnCl reagent was dropped on authentic cellulose, a blue color developed. When the $I_2$-ZnCl reagent was dropped on the thermal polyglucose, no blue color appeared. Therefore, the thermal polyglucose did not possess cellulose-like linkages.

The thermal polyglucose was hydrolyzed and tested for the presence of monosaccharides with Benedict solution according to a procedure developed by Hawk et al. (1954). Concentrated sulfuric acid (20 ml) was slowly added to 12 ml of water. This solution was allowed to cool to room temperature and then used to hydrolyze the thermal polyglucose. Application of the Benedict test to the hydrolysate of the thermal polyglucose was done in a manner developed by Harrow et al. (1955). Benedict's qualitative reagent (5 ml) was added to solutions of authentic monosaccharides, the solutions heated, and red precipitates formed in the solutions. Benedict's qualitative reagent (5 ml) was added to a hydrolysate of the thermal polyglucose, the solution heated, and a red precipitate formed in the solution. Therefore, the thermal polyglucose linkages, which are not starch-like and are not cellulose-like, can be hydrolyzed with sulfuric acid.

Some polysaccharides such a chitin contain free amino groups. The thermal polyglucose could have incorporated some free amino groups into its structure due to the fact that its initial reaction mixture contained glutamic acid. Therefore, the presence or absence of free amino groups in the thermal polyglucose was tested for with standard ninhydrin reagent. When 1% ninhydrin solution was added to authentic glutamic acid, a dark blue color appeared. When 1% ninhydrin solution was added to authentic chitin, a blue color appeared. When the 1% ninhydrin solution was added to the thermal polyglucose, no blue color appeared. Therefore the polyglucose did not contain free amino groups.

This still left the question of whether the thermal polyglucose contained any nitrogen in the form of pyroglutamic acid which might be chemically bound to the thermal polyglucose. Therefore, some of the thermal polyglucose was hydrolyzed for 1 hr. in sulfuric acid. Authentic pyroglutamic acid was subjected to the sulfuric aCid for 1 hr. as a control. The thermal polyglucose hydrolysate and the control were then subjected to the ninhydrin solution described above. Both the hydrolysate and the control gave negative ninhydrin tests. This indicated that a 1 hr. hydrolysis with sulfuric acid was not sufficient to convert pyroglutamic acid into glutamic acid.

As an alternative to sulfuric acid, hydrochloric acid was subsequently used to hydrolyze any pyroglutamic acid to glutamic acid. Some of the thermal polyglucose was placed in a sealed test tube with 2 N HCl. Authentic pyroglutamic acid was placed in another tube as a control and was treated similarly. The sample and the control tubes were then placed in boiling water for $1\frac{1}{2}$ hr. Ninhydrin solution was then added to the sample and the control, which were then heated to the boiling point. After cooling, a few solid pellets of KOH were added to neutralize the HCl. The control turned a maroon color indicating the presence of free amine groups. The sample did not turn maroon, indicating that the thermal polyglucose contained no nitrogens in the form of bound pyroglutamic acid. Since the thermal polyglucose contained neither free amino groups as in glutamic acid nor secondary amino groups as in pyroglutamic acid, it was reasonable to conclude that the thermal polyglucose did not contain nitrogen in any form. Therefore, the thermal polyglucose is a true carbohydrate.

What is claimed is:

1. A process for the preparation of thermal polysaccharides consisting of heating monosaccharides in the presence of glutamic acid at 140° for 12 hours under a nitrogen atmosphere.

* * * * *